United States Patent [19]

Forbes

[11] 4,077,592
[45] Mar. 7, 1978

[54] SUPPORTING OF DUCTING

[76] Inventor: George Alfred Forbes, 75 Ellerby St., London S.W.6., England

[21] Appl. No.: 651,022

[22] Filed: Jan. 21, 1976

[30] Foreign Application Priority Data

Jan. 29, 1975 United Kingdom ................ 3864/75
Apr. 1, 1975 United Kingdom .............. 13135/75
May 23, 1975 United Kingdom .............. 22751/75

[51] Int. Cl.² ............................................ F16L 3/00
[52] U.S. Cl. ..................................... 248/59; 138/107
[58] Field of Search ...................... 52/28, 39; 138/107; 248/49, 58–65, 68 R, 70, 323, 327

[56] References Cited

U.S. PATENT DOCUMENTS

| | | | |
|---|---|---|---|
| 2,003,159 | 5/1935 | Taylor | 248/62 |
| 2,026,312 | 12/1935 | Houts | 248/49 |
| 2,291,491 | 7/1942 | Naysmith | 138/107 X |
| 2,341,311 | 2/1944 | Carlson | 138/107 |
| 2,347,113 | 4/1944 | King | 138/107 X |
| 2,352,145 | 6/1944 | Wright | 248/58 |
| 2,736,528 | 2/1956 | Le Brock | 248/59 |
| 2,846,169 | 8/1958 | Sullivan | 248/62 |

FOREIGN PATENT DOCUMENTS

| | | | |
|---|---|---|---|
| 2,128,915 | 1/1973 | Germany | 248/59 |
| 1,076,941 | 7/1967 | United Kingdom | 248/68 R |

Primary Examiner—Lawrence J. Staab
Attorney, Agent, or Firm—Scully, Scott, Murphy & Presser

[57] ABSTRACT

A method of supporting rectangular-sectioned ducting according to which the ducting is supported at each of a number of spaced positions along its length by means of a pair of opposed angle elements in which the ducting is directly or indirectly seated at its lower corner edges, the angle elements being secured together by means of a tie rod extending beneath the bottom wall of the ducting and being suspended from drop rods.

10 Claims, 7 Drawing Figures

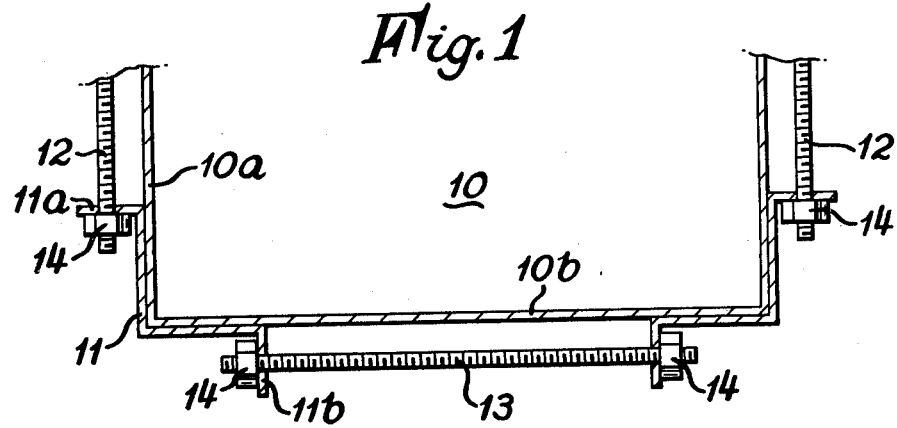
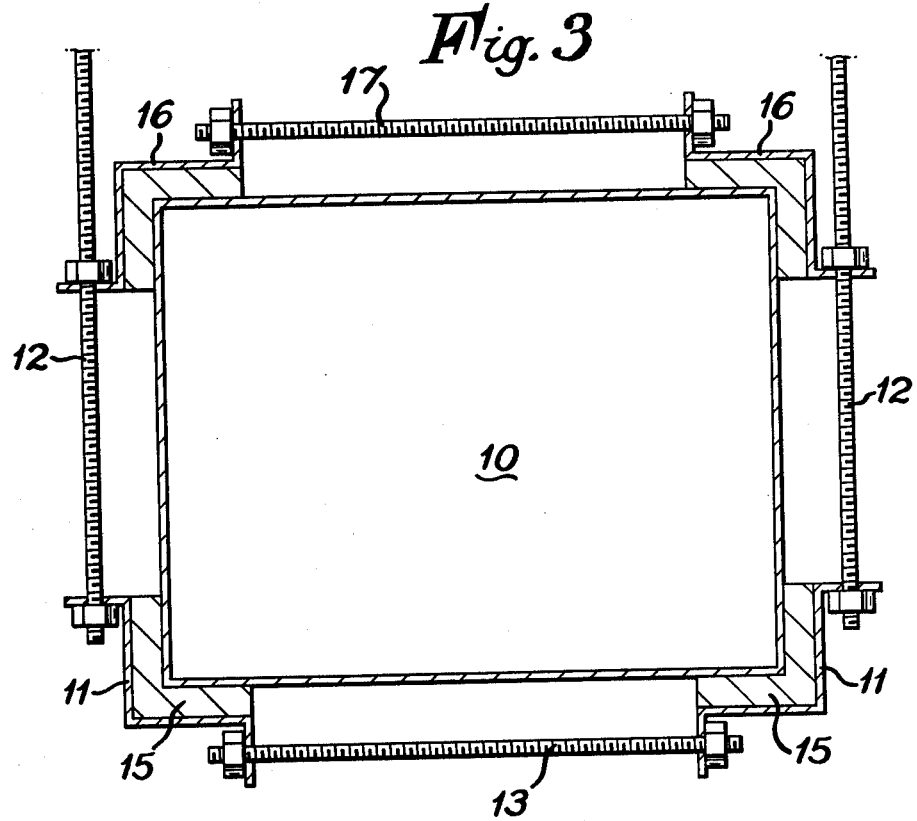

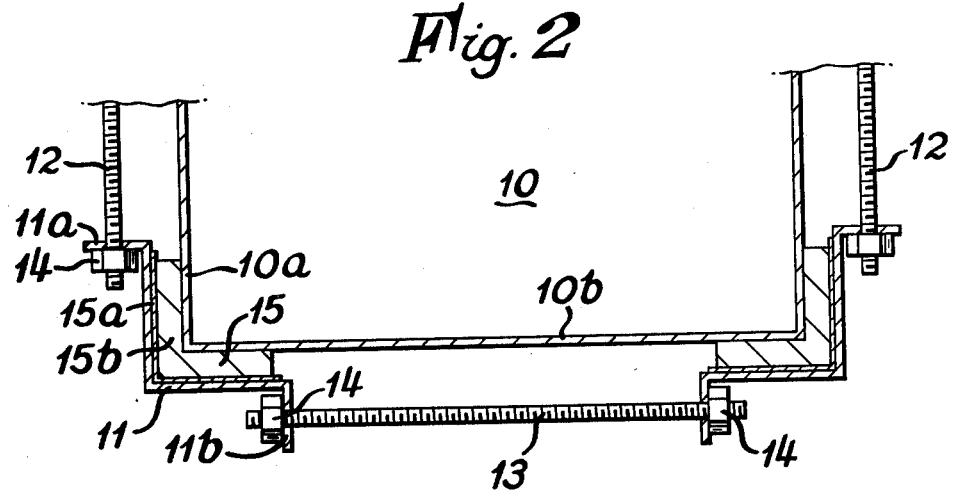
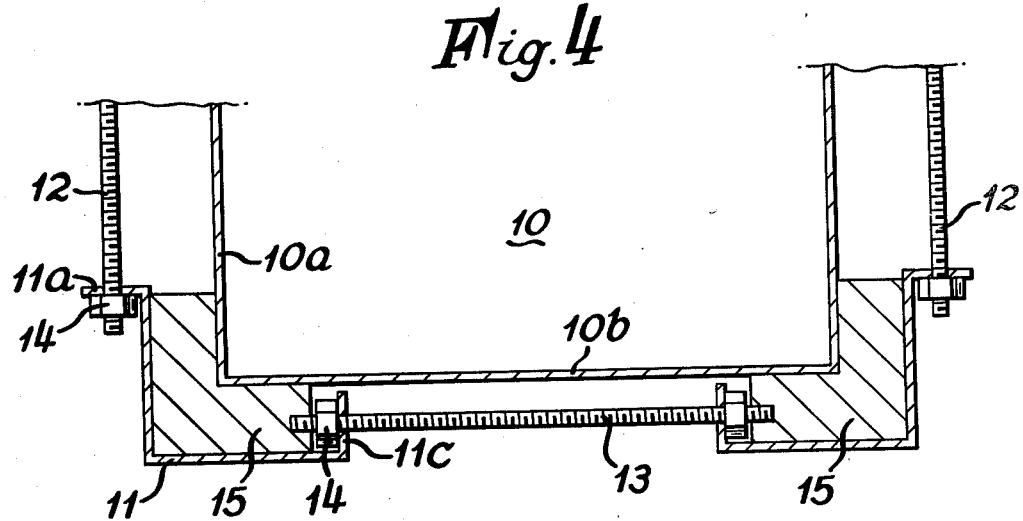

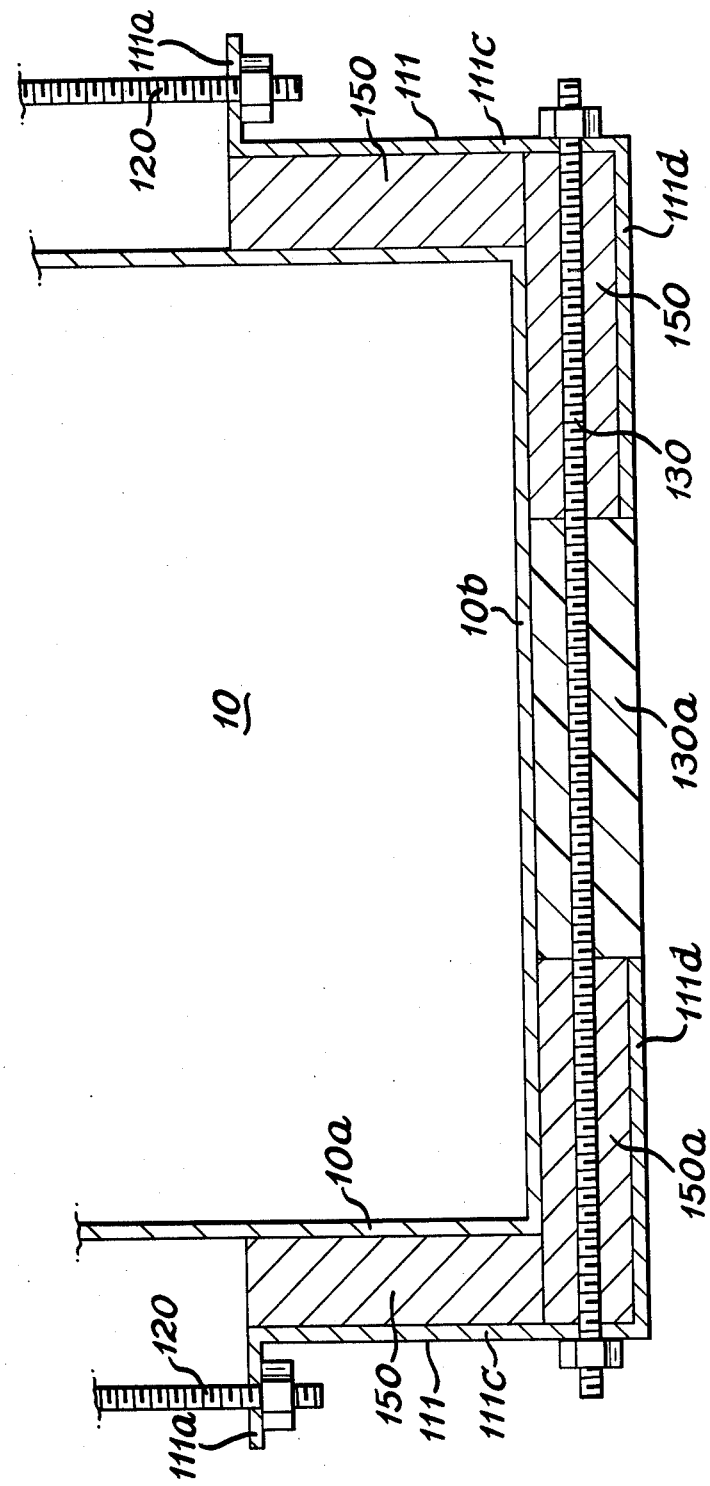

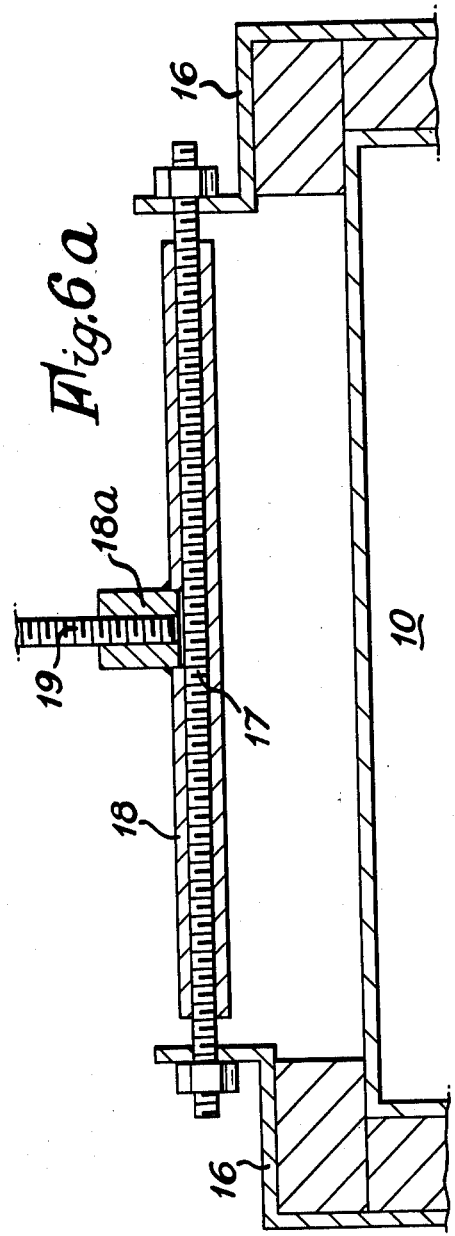
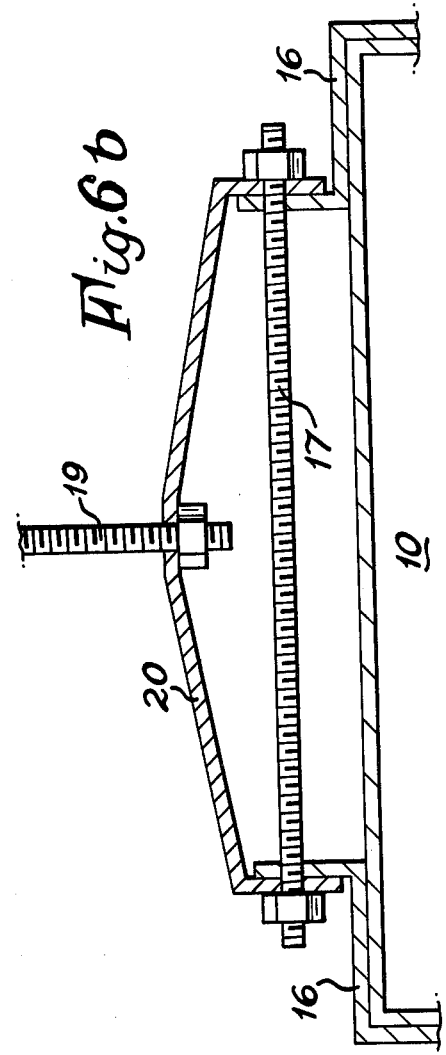

SUPPORTING OF DUCTING

FIELD OF THE INVENTION

This invention relates to the supporting of rectangular-sectioned ducting, such as air ducting in an air-conditioning system.

PRIOR ART

Hitherto, such ducting has conventionally been supported by means of drop rods on opposite sides of the ducting, these drop rods being secured at their lower ends to opposite ends of a transversely extending angle-sectioned or channel-sectioned support member having a horizontal web on which rests the underside of the ducting. The ducting is thus in contact with the support member across the entire width of the ducting. Further, it is usual to position the drop rods against the sides of the ducting to prevent lateral movement of the ducting.

With the conventional arrangement, heat insulation for the ducting has to be specially cut and tailored up to and around the support means, thus incurring high labour costs. In addition, substantial contact between the ducting and the support means is undesirable, in particular to avoid loss of heat by conduction, to reduce noise levels in the building in which the ducting is installed and to avoid condensation.

OBJECT OF THIS INVENTION

It is an object of the present invention to provide an improved method and means of supporting rectangular-sectioned air ducting to minimize the disadvantages of the conventional arrangement.

BRIEF SUMMARY OF THE INVENTION

According to the invention, there is provided a method of supporting rectangular-sectioned ducting according to which the ducting is supported at each of a number of spaced positions along its length by means of a pair of opposed angle elements in which the ducting is directly or indirectly seated at its lower corner edges, the angle elements being secured together by means of a tie rod extending beneath the bottom wall of the ducting and being suspended from drop rods.

The invention also provides a support for rectangular-sectioned ducting comprising:-

A support for rectangular sectioned ducting, comprising:- a plurality of pairs of angle elements spaced along the length of the ducting and constituting seats for the lower corner edges of the ducting;

a corresponding plurality of tie rods securing the angle elements of the respective pairs together with said tie rods extending beneath the bottom wall of the ducting; and drop rods for suspending the angle elements.

FURTHER FEATURES OF THIS INVENTION

Preferably, the ducting is seated on the opposed angle pads through the intermediary of isolating elements, such as pads of thermal and/or sound insulating material. Conveniently the tie rod may be treated in a plane parallel to and between the bottom wall of the ducting and the parallel webs of the opposed angle elements which are spaced from this bottom wall by the isolating elements. The tie rod may then be concealed by application of lagging to the bottom wall of the ducting.

In order to minimize heat loss by conduction and to reduce noise transmission, the tie rod is preferably spaced from the bottom wall of the ducting, while the drop rods are spaced from the side walls of the ducting. For this purpose, the angle elements may be provided with flanges to which the tie rod and/or drop rods are secured.

The flanges or webs of the angle elements are conveniently pre-drilled to receive the ends of the drop rods and the tie rod, which can be threaded to receive a nut which is tightened against the corresponding flange or web. The rod constituting the tie rod is generally less expensive than the angle-sectioned or channel-sectioned support used in the known arrangement. In addition, the method of the present invention is easier to carry out than the use of the known arrangement, which requires the angle-sectioned or channel-sectioned support member to be cut substantially to length with holes for drop rods accurately drilled at the opposite ends of the cut length.

When insulating pads are located between the angle elements and the ducting, it may be convenient to fabricate the angle elements and the associated isolating elements as a unitary member in order to reduce assembly work on site.

For each pair of angle elements supporting the ducting at its lower corner edges, an additional pair of angle elements may be provided to locate the ducting at its upper corner edges, either directly or through the intermediary of further isolating elements, this additional pair of angle elements preferably clamping the ducting between them by means of a tie rod which extends across the ducting above the top wall thereof, preferably in spaced relationship to said wall. Further tie rods preferably spaced from the side walls of the ducting may be used to secure each pair of upper angle elements to the corresponding lower pair. The upper pairs of angle elements or the tie rods extending between them may then be suspended in various ways, for example by means of a suspension bracket or drop rods separate from or integral with the further tie rods at the sides of the ducting which secure together the corresponding pairs of upper and lower angle elements.

Methods for carrying out the present invention will now be described by way of example, with reference to the accompanying drawings, in which:

BRIEF DESCRIPTION OF DRAWINGS

FIG. 1 shows one method of supporting the ducting at its lower edges, in broken transverse sectional view through the ducting;

FIG. 2 shows a preferred method of supporting the ducting at its lower edges;

FIG. 3 shows the preferred method in transverse sectional view through the ducting, also showing optionally usable angle elements for locating the upper edges of the ducting;

FIGS. 4 and 5 show modifications of the preferred method of supporting the ducting at its lower edges, also in broken transverse sectional view; and FIGS. 6a and 6b show alternative arrangements of suspension means applicable to the case when angle elements are used to locate the upper edge of the ducting.

DESCRIPTION OF EMBODIMENTS

Referring to FIG. 1, in a typical air-conditioning system, rectangular-sectioned air ducting 10 is supported at spaced intervals along its length. At each position of support, the ducting is seated at corresponding opposite points along its lower corner edges in a pair of opposed angle elements 11. Each angle element is made of bent flat strip and is formed at the top of its vertical limb with an integral horizontal flange 11a extending laterally away from the side wall 10a of the ducting and at the inwardly directed end of its horizontal limb with an integral flange 11b extending vertically downwards away from the bottom wall 10b of the ducting. Each flange is drilled to receive the screw-threaded end of a rod, which is secured by means of a nut. Thus, the horizontal flanges 11a are respectively secured by nuts 14 to a pair of screw-threaded drop rods 12 which extend downwardly from a suitable supporting structure (not shown and forming part of the building in which the ducting is installed) in spaced relation to the side walls 10a of the ducting. The vertical flanges 11b of the pair of angle elements are tied together by means of a screw-threaded tie rod 13, which is secured in position by means of nuts 14. The tie rod 13 is spaced from the bottom wall 10b of the ducting.

The angle elements 11 may be made small in relation to the dimensions of the ducting 10 (the size of the angle elements is exaggerated in the drawings for clarity), so as not only to facilitate the application of heat insulation to the ducting, which insulation can readily be extended past the support means in the spacing between the ducting 10 and the rods 12 and 13, but also to minimize loss of heat by conduction, noise and condensation.

Referring now to FIG. 2, at each position of support, the ducting 10 is again seated at corresponding opposite points along its lower corner edges in a pair of opposed angle elements 11. However, on the interior angle surface of each angle element is located a compound isolating element 15 comprising an outer skin 15a of bituminous rubber sheet and an inner angle pad 15b of high density cork or other suitable heat and sound insulating material, preferably of sufficient rigidity to be substantially imcompressible under the weight of the ducting 10. The angle elements 11 are secured together in the previously described manner by a tie rod 13 and suspended by drop rods 12.

Preferably, the angle elements 11 and the angle pads 15 are fabricated as an integral structure to reduce assembly work on site. If desired the pads 15 may be of smaller width than the angle elements 11, in order to further facilitate the tailoring of insulating lagging to the ducting around the supporting means. It should also be mentioned that, in may cases, the outer skin 15b of the isolating elements 15 may be omitted, and sometimes the pads 15a may be omitted, so that in the latter case the isolating elements are constituted solely by the sheets of bituminous rubber. Plastic sheet material may be substituted in some instances.

A major advantage of the present invention requiring emphasis is the extremely tight clamping of the ducting which is effected by means of the padded angle elements 11 connected by tie rods 13. Noise which can arise due to vibration of the ducting is thus substantially eliminated and other noise is most effectively deadened. The use of pads of insulating material having high rigidity is valuable to preserve the noise deadening property over a long life. Pads of elastic material even though initially compressed to a lesser or greater extend by tightening of the tie rods, will in time give a reduced clamping effect and thus less of noise deadening property as the elasticity tends to diminish with age.

In a modification which is shown in FIG. 3, pairs of padded angle elements 16 connected by tie rods 17 are also provided at the upper corner edges of the ducting 10, and each upper pair is secured to the corresponding lower pair, to clamp the ducting in the vertical direction, by means of the drop rods 12. In this modification the drop rods 12 are also serving as tie rods between the upper and lower pairs of angle elements 13 and 17, and it is possible to use these rods solely as tie rods, the ducting being supported by means of a suitable suspension bracket or separate drop rods connected to the upper pairs of angle elements or the tie rods extending between them, as will be subsequently described with reference to FIGS. 6a and 6b.

A modified method is shown in FIG. 4. The downturned flange 11b on the angle elements are replaced by upturned flanges 11c. The tie rod 13 is treated in a plane parallel to and between the bottom wall 10b of the ducting and the parallel limbs of the angle elements.

Another modification of the preferred method for carrying out the present invention is shown in FIG. 5. The rectangular-sectioned air ducting 10 is again supported at spaced intervals along its length. At each point of support, the ducting 10 is seated at corresponding opposite points along its lower corner edges in a pair of opposed angle elements 111. On the interior angle surface of each angle element is located an angle pad 150 (which may be formed in two parts) of high density cork or other suitable heat and sound insulating material, preferably of sufficient rigidity to be substantially incompressible under the weight of the ducting 10. Each angle element 111 is made of bent flat strip and is formed at the top of its verticle limb with an integral horizontal flange 111a extending laterally away from the side wall 10a of the ducting.

The vertical limb 111c of each pair of opposed angle elements 111 are secured together by means of a tie rod 130 which extends between the vertical limbs of said pair of angle elements between the bottom wall 10b of the ducting 10 and the horizontal limbs 111d of the angle elements. The tie rod 130 thus extends through the horizontal limbs 150a of the angle pads 150 of heat and sound insulating material, which are contained between the horizontal limbs 111d of the angle elements and the bottom wall 10b of the ducting.

As previously mentioned, the angle elements may be made small in relation to the dimensions of the ducting, so that the tie rod would be exposed beneath the bottom wall of the ducting in the central region thereof between the angle elements. However, when heat insulation 130a is applied to minimise loss of heat by conduction, and to minimise noise and condensation, this insulation will be applied over and around this exposed portion of the tie rod, so that the supported ducting presents a tidy flat surface when viewed from below. The same advantage also applies to the method of FIG. 4. Thus the preferred method has all the advantages of the methods previously described, with the additional advantage that the lower tie rod is substantially concealed and the supported ducting presents a tidier and more pleasing appearance from below.

As described with reference to FIGS. 1 to 5, the horizontal flanges 111a of the angle elements 111 are respectively secured to a pair of drop rods 120 which extend downwardly from a suitable supporting sturcture (not shown and forming part of the building in which the ducting 10 is installed) in spaced relation to the side walls 10a of the ducting.

Referring now to FIG. 6a where an additional pair of angle elements 16 is provided for the upper corners of the ducting 10, these additional angle elements 16 may be secured together by a tie rod 17 which is used to suspend the ducting assembly. For example, this upper tie rod 17 spaced from the upper wall of the ducting may be surrounded by a sleeve 18 or small bore pipe having a central T junction 18a providing a socket which is internally screw-threaded to receive a single drop rod 19.

Alternatively, as shown in FIG. 6b the upper pair of angle elements 1t may be tied together by a suspension bar 20 adapted to receive a central drop rod 19. In other cases, for example when the ducting is used in a ship, the drop rods 12 may be carried by lateral brackets fixed to a central supporting structure.

Various further modifications of the abovedescribed methods are possible within the scope of the invention.

I claim:

1. A supporting arrangement for rectangular-sectioned ducting comprising:

four angle elements in which the corners of the ducting are seated at a given position along the length of the ducting, each angle element comprising two mutually perpendicular webs and apertured flanges projecting from the respective webs at right angles thereto, the apertured flanges on the webs of the angle elements below the bottom wall of the ducting projecting upwardly towards said ducting bottom wall, the remaining webs of all of the angle elements projecting outwardly away from the adjacent ducting wall;

four substantially coplanar tie rods respectively extending parallel to the four walls of the ducting in spaced relationship thereto, each respective tie rod passing through the apertures of the flanges of respectively two angle elements located at adjacent corners of the ducting;

securing means on the tie rods acting against the flanges of the angle elements to clamp the ducting between the angle elements in each of two mutually perpendicular directions;

and suspension means attached to the uppermost tie rod to suspend the ducting from a building structure.

2. An arrangement according to claim 1, comprising isolating pads carried by the webs of the angle elements on their inner faces to embrace the corners of the ducting, the width of said pads being less than the width of the angle elements.

3. An arrangement according to claim 2, wherein the suspension means comprises a single drop rod located substantially above the center of the length of the uppermost tie rod and securing means connecting the lower end of said drop rod to said uppermost tie rod symmetrically about said length center.

4. An arrangement according to claim 1, wherein the suspension means comprises a single drop rod located substantially above the center of the length of the uppermost tie rod and securing means connecting the lower end of said drop rod to said uppermost tie rod symmetrically about said length center.

5. A supporting arrangement for rectangular-sectioned ducting comprising:

four angle elements in which the corners of the ducting are seated at a given position along the length of the ducting, each angle element comprising two mutually perpendicular webs and apertured flanges projecting from the respective webs at right angles thereto, the apertured flanges on the webs of the angle elements below the bottom wall of the ducting project upwardly towards said ducting bottom wall, the remaining webs of all of the angle elements projecting outwardly away from the adjacent ducting wall;

isolating pads of thermal and sound insulating material separating the inner faces of the angle elements from the walls of the ducting at the corners of the ducting seated in said angle elements, said isolating pads being of narrower width than the width of the angle elements;

four substantially coplanar tie rods respectively extending parallel to the four wall of the ducting in spaced relationship thereto, each respective tie rod passing through the apertures of the flanges of respectively two angle elements located at adjacent corners of the ducting;

securing means on the tie rods acting against the flanges of the angle elements to clamp the ducting between the angle elements in each of two mutually perpendicular directions;

and suspension means attached to the uppermost tie rod to suspend the ducting from a building structure.

6. An arrangement according to claim 5, wherein the suspension means comprises a single drop rod located substantially above the center of the length of the uppermost tie rod and securing means connecting the lower end of said drop rod to said uppermost tie rod symmetrically about said length center.

7. A supporting arrangement for rectangular-sectioned ducting comprising:

a pair of angle elements in which the lower corners of the ducting are seated at a given position along the length of the ducting;

each angle element comprising two mutually perpendicular horizontal and vertical webs and apertured flanges projecting from the respective webs at right angles thereto, the flanges on the horizontal webs of the angle elements below the bottom wall of the ducting projecting upwardly towards said bottom wall and the flanges on the vertical webs of said angle elements projecting outwardly away from the adjacent side walls of the ducting;

a tie rod extending parallel to the bottom wall of the ducting in spaced relationship thereto, said tie rod being secured to said upwardly directed apertured flanges to clamp the ducting between said angle elements;

and drop rods suspending the angle elements at said outwardly directed flanges.

8. An arrangement according to claim 7, wherein said drop rods constitute tie rods; a second pair of flanged angle elements in which the ducting is seated at its upper corners, said tie rods being dropped from said second pair of angle elements; a further tie rod tying the second pair of angle elements together, said further tie rod extending parallel to the top face of the ducting in spaced relationship thereto.

9. An arrangement according to claim 7, comprising isolating pads carried on the webs of the angle elements on their inner faces so as to embrace the corners of the ducting, the width of said pads being less than the width of the angle elements.

10. A supporting arrangement for rectangular-sectioned ducting comprising:

a pair of angle elements in which the lower corners of the ducting are indirectly seated at a given position along the length of the ducting;

each angle element comprising two mutually perpendicular horizontal and vertical webs and apertured flanges projecting from the vertical webs at right angles thereto and outwardly away from the adjacent side walls of the ducting;

horizontal and vertical isolating pads separating the inner faces of the angle elements from the walls of the ducting at the corners of the ducting seated in said angle elements;

a tie rod extending parallel to the bottom wall of the ducting in spaced relationship thereto, said tie rod extending through the horizontal isolating pads to be secured between the vertical webs of the angle elements in order to clamp the ducting between said angle elements;

and drop rods suspending the angle elements at said outwardly directed flanges.

* * * * *